(12) United States Patent
Nos et al.

(10) Patent No.: US 9,146,955 B2
(45) Date of Patent: Sep. 29, 2015

(54) IN-MEMORY, COLUMNAR DATABASE MULTIDIMENSIONAL ANALYTICAL VIEW INTEGRATION

(71) Applicant: SAP AG, Walldorf (DE)

(72) Inventors: Karl-Peter Nos, Nussloch (DE); Dirk Baumgaertel, Hockenheim (DE); Torsten Bachmann, St. Leon-Rot (DE)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 13/718,903

(22) Filed: Dec. 18, 2012

(65) Prior Publication Data

US 2014/0172827 A1    Jun. 19, 2014

(51) Int. Cl.
*G06F 17/30* (2006.01)

(52) U.S. Cl.
CPC .... *G06F 17/30424* (2013.01); *G06F 17/30392* (2013.01)

(58) Field of Classification Search
CPC ............ G06F 17/30418; G06F 17/30554; G06F 17/30451; G06F 17/30392; G06F 17/30424
USPC ......................... 707/717, 722, 769
See application file for complete search history.

(56) References Cited

U.S. PATENT DOCUMENTS

| | | | |
|---|---|---|---|
| 6,831,668 B2 | 12/2004 | Cras et al. | |
| 7,356,779 B2 | 4/2008 | Cras et al. | |
| 8,423,501 B2 * | 4/2013 | Wu et al. | 706/56 |
| 8,510,261 B1 * | 8/2013 | Samantray | 707/602 |
| 2004/0236643 A1 * | 11/2004 | Dick et al. | 705/28 |
| 2010/0036788 A1 * | 2/2010 | Wu et al. | 706/47 |
| 2010/0318974 A1 | 12/2010 | Hrastnik et al. | |
| 2011/0125696 A1 * | 5/2011 | Wu et al. | 706/47 |
| 2011/0282704 A1 * | 11/2011 | Graeber et al. | 705/7.11 |
| 2011/0320251 A1 * | 12/2011 | Ates et al. | 705/14.17 |
| 2012/0166620 A1 | 6/2012 | Said et al. | |
| 2013/0086547 A1 * | 4/2013 | Said et al. | 717/104 |
| 2013/0166497 A1 * | 6/2013 | Schroetel et al. | 707/602 |

OTHER PUBLICATIONS

"Business Object Action," NetWeaver Process Integration 7.1, visited Jun. 11, 2012, 1 page.
"Business Object Types," SAP NetWeaver 2004 SPS23, visited Jun. 6, 2012, 2 pages.
"Object-Based Navigation (OBN)," SAP Help NetWeaver 7.0, visited Jun. 7, 2012, 3 pages.
"Product Documentation, SAP Business ByDesign FP 3.5: Analytics," visited Jun. 7, 2012, 113 pages.
"Ranet OLAP Component Library," Galantis Inc., visited Jun. 18, 2012, 4 pages.
"SAP Business ByDesign: Analytics," SAP AG, on or before Jun. 7, 2012, 78 pages.
Clover et al., "Introducing the New Rich-Client OLAP Analyzer from SAS—SAS Enterprise Guide 3.0 OLAP Analyzer," SUGI29, Montreal, Canada, May 9-12, 2004, 6 pages.

(Continued)

*Primary Examiner* — Phong Nguyen
(74) *Attorney, Agent, or Firm* — Klarquist Sparkman, LLP

(57) ABSTRACT

A multidimensional analytical view (MDAV) type can be supported for an in-memory, columnar database, and MDAV calculations can be integrated into the database. Such an MDAV can be combined with other MDAV types as desired. Calculations typically performed at the application layer can be pushed down to the database. A model-based approach allows generation of a calculation plan, and calculations can be performed directly on the database.

19 Claims, 13 Drawing Sheets

(56) References Cited

OTHER PUBLICATIONS

Dubler et al., "Just What are Cubes Anyway? (A Painless Introduction to OLAP Technology)," Microsoft Corporation, Apr. 2002, 8 pages.
Lutz, "Analyzing Data Shouldn't be Rocket Science: OLAP for Silverlight," The Code Project, Feb. 9, 2011, 4 pages.
Online Analytical Processing, *Wikipedia*, visited May 29, 2012, 7 pages.
Role-Based Access Control, *Wikipedia*, visited May 29, 2012, 6 pages.
Tuan, "CD 122, Five Essential SAP Business ByDesign Customizing Capabilities That Every Partner Should Know," SAP TechEd, Sep. 2011, 21 pages.
Using the Search and Analytics Modeler, SAP Help, visited May 30, 2012, 4 pages.
Schneider, "SAP Business ByDesignStudio—Application Development," Galileo Press, Published Nov. 1, 2011, Chapter 8, 29 pages.

* cited by examiner

US 9,146,955 B2

IN-MEMORY, COLUMNAR DATABASE MULTIDIMENSIONAL ANALYTICAL VIEW INTEGRATION

BACKGROUND

As enterprises accumulate ever greater amounts of data on their transactions, processes, products, and operations, online analytical processing has become an essential part of doing business. The number of tools and techniques addressing analytical processing has grown, enabling data analysts to quickly analyze and navigate through vast complex collections of data.

By conventional practice, online analytical processing is traditionally performed on data that is separate from live transactional data. Further, joins, unions, and calculations are typically performed on data retrieved from a database. So, if a user wishes to combine views, complicated modifications to the analytical software are often required. Accordingly, although current approaches provide a wide variety of functionality, there is room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A multidimensional analytical view (MDAV) can be implemented on an in-memory, columnar database. For example, operations related to analytics requests can be performed directly on the database. A model-based approach can be used to generate calculation plans for arbitrary combinations of tables in join and union scenarios. Such MDAVs can be combined with other MDAV types and used for reporting.

As described herein, a variety of other features and advantages can be incorporated into the technologies as desired.

DETAILED DESCRIPTION

Example 1

Exemplary Overview

The technologies described herein can be used for multidimensional analytical view integration techniques in a variety of scenarios. Adoption of the technologies can provide efficient actions in OLAP scenarios as well as improve usability.

The technologies can be helpful for those wishing to reduce the complexities and resources related to online analytical processing. Beneficiaries include developers who wish to more easily give their users more flexibility in their online analytical processing reports. End users can also benefit from the technologies because performance is improved and views can be combined without having to resort to programming changes.

Example 2

Figure 1:
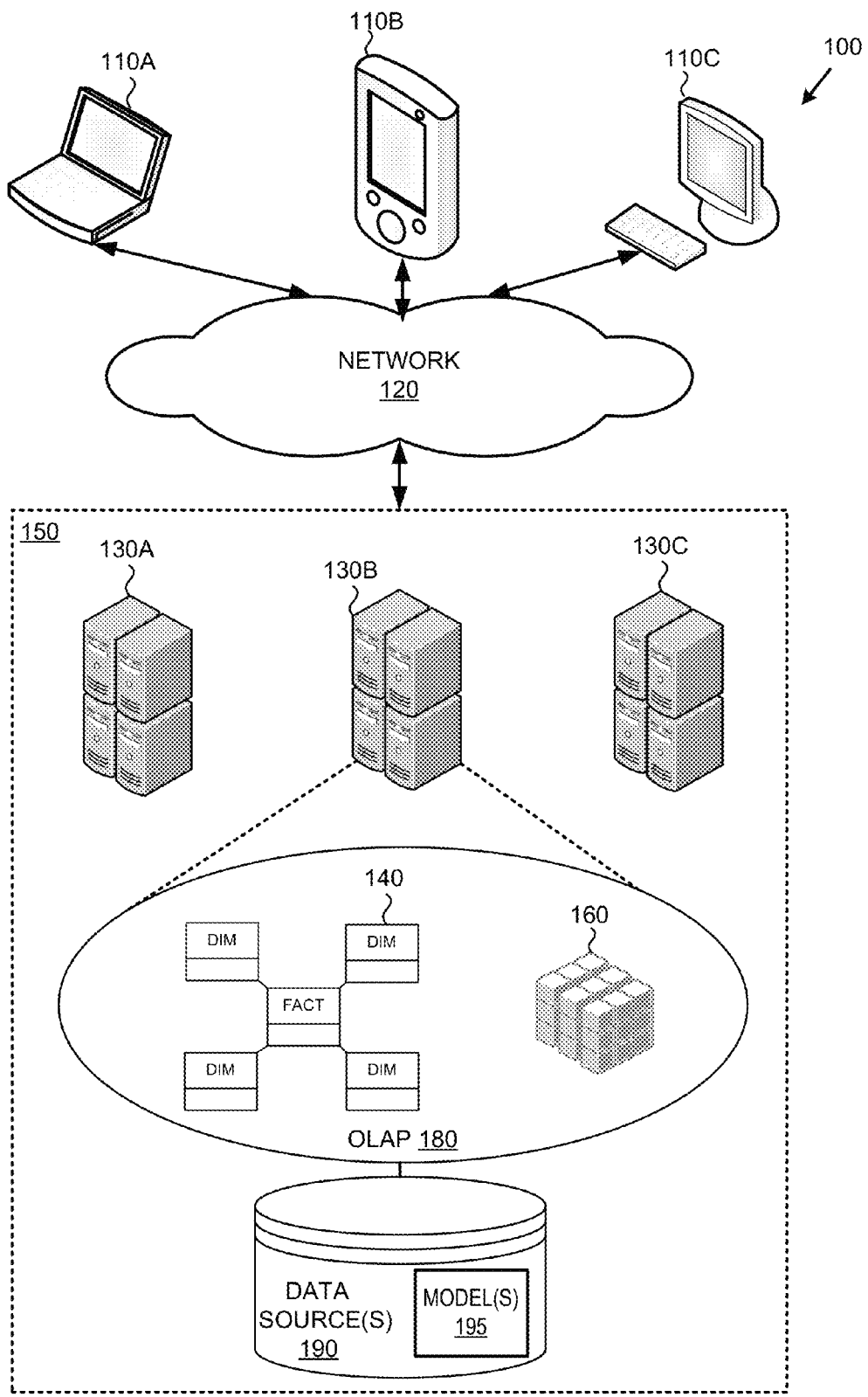
FIG. 1 is a block diagram of an exemplary system implementing a multidimensional analytical view integration scenario.

Exemplary System Implementing Single Persistence Supporting Business Objects FIG. 1 is a block diagram of an exemplary system 100 implementing multidimensional analytical view integration as described herein.

In the example, one or more online analytical processing consumers 110A-C can access the data processing system 150 via a network 120. The network 120 can be the Internet or some other public network, a private network, a virtual private network, or the like. The consumers 110A-C and the network are shown for context and can be operated and maintained by an entity other than that operating the system 150. Further, the supporting hardware 130A-C can vary greatly.

Consumers 110A-C can access the system 150 to avail themselves of online analytical processing services that use technologies such as star schema 140, snowflake schema, data cubes 160, and the like. However, as described herein, such services can be provided via a single persistence, and operations can be performed directly on the database, rather than using data duplication, extract, transform, and load (ETL) techniques, or the like.

When accessing online analytical processing services, any of a variety of data sources 190 can be specified. As described herein, a multidimensional analytical view based on an in-memory, columnar database (e.g., an MDAV based on a view of the database) can be supported as a type of data source. Such data sources can be accompanied by one or more data models 195 that specify relationships between the data and can be used to generate calculation plans as described herein.

The data sources 190 can persist a plurality of business object instances (e.g., of one or more business object types) in one or more computer-readable storage media. As described herein, business objects can have associated business logic, and the multidimensional analytical views that incorporate such business objects can accommodate such business logic without special programming when incorporating the business objects into the views.

Consumers 110A-C can access the technologies 140, 160 according to a business object model that can be used to fulfill requests for OLAP services 180. The business object model can include conventions for representing different business object types and persisting the attributes of business object instances. For example, business object functionality can be implemented by accessing the business object business logic according to the model. The structure of business objects and relationships between them can be represented in a business object metadata repository. Although a business object's metadata logically belongs to the business object, they are stored in the business object metadata repository. In this way, the system 100 can support a plurality of business objects.

In practice, the systems shown herein, such as system 100 can vary in complexity, with additional functionality, more complex components, and the like. For example, additional components can be included to implement security, report design, and the like.

The system 100 and any of the other systems described herein can be implemented in conjunction with any of the hardware components described herein, such as the computing systems described below (e.g., processing units, memory, and the like). In any of the examples herein, the inputs, outputs, and tools can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing, software-as-a-service (SaaS), and multi-tenant techniques can be applied to give clients the ability to perform the described techniques via a rich Internet application without concern over the actual computing infrastructure needed or used to operate the system 150, which can be administered by a business entity different from the client user.

Example 3

Exemplary Method Implementing a Single Persistence Supporting Business Objects

Figure 2:
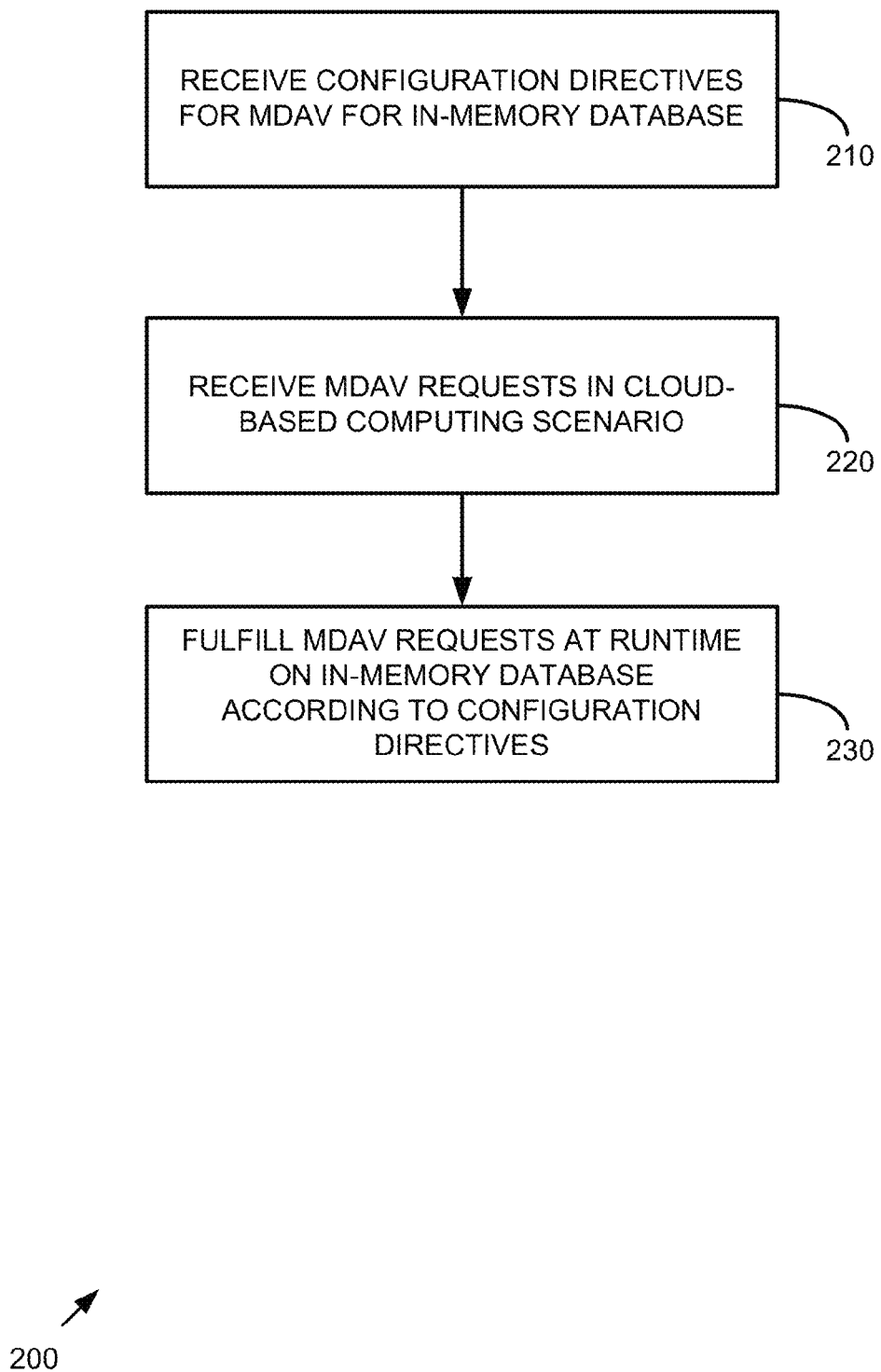
FIG. 2 is a flowchart of an exemplary method of implementing multidimensional analytical view integration.

FIG. 2 is a flowchart of an exemplary method 200 of implementing multidimensional analytical view integration and can be implemented, for example, in the system shown in FIG. 1.

At 210, configuration directives are received for a multidimensional analytical view based on an in-memory database. Such configuration directives can then be used to modify data models (e.g., stored as metadata for the MDAV or an ordinary (e.g., non-MDAV) view of an in-memory, columnar database underlying an MDAV). A modeling approach can avoid having to resort to coding when using the multidimensional analytical view or modifying it by combination with other views or the like.

The metadata for an MDAV model can be derived to a large extent directly from the in-memory, columnar database model. Some supplemental data can be added to support cloud-computing or SaaS scenarios, such as when native functions are desired (e.g., different text handling of labels).

From the perspective of an MDAV consumer, the MDAV based on an in-memory, columnar database view can behave like any other MDAV. For example, it is possible to use such an MDAV in union and join MDAVs.

Configuration directives can include those related to design data sources for business analytics reports. For example, a view of an in-memory, columnar database (e.g., associated with a data model) can be specified as a data source. MDAVs built on such a data source are said to have an in-memory, columnar database underlying the MDAV and can draw on the data model for the associated database view.

At 220, multidimensional analytical view requests are received in a cloud-based computing scenario. For example, a client program can send a directive to navigate to a different dimension or attribute value supported by a business object involved in an MDAV or the like.

At 230, the MDAV requests are fulfilled at runtime on the in-memory database according to the configuration directives (e.g., from 230). At runtime, the calculation view of the in-memory, columnar database can be called to retrieve data.

After fulfilling the service requests, consumers of the services can display results associated with the requests (e.g., displayed attributes or analytics performed on the attributes).

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Analytical Processing Consumer

In any of the examples herein, a consumer of analytical processing services can be any software accessing online analytical processing (OLAP), or other services associated with a multidimensional analytical view. As described herein, analytical processing can essentially bypass a business logic layer, but still be considered availing itself of the business object framework (e.g., as represented in metadata).

As described herein, such consumers can execute on any of a variety of computing systems, including cloud-based arrangements, software-as-a-service (SaaS) arrangements, and the like.

Example 5

Exemplary Single Persistence

In any of the examples herein, a single (e.g., primary) persistence can be used for both OLTP and OLAP. Unlike conventional data warehousing techniques, as soon as a change to a business object is saved, it can be reflected for OLAP, and a second persistence of the data is not needed for OLAP.

Example 6

Exemplary Multidimensional Analytical View

In any of the examples herein, a multidimensional analytical view (MDAV) can be a view of data that supports online analytical processing operations such as roll-up, drill-down, slice-and-dice, pivot, and the like. Such a view typically takes the form of a fact table (e.g., also called a "cube") with dimension attributes and dependent attributes (e.g., functions of the dimension attributes, such as calculated values) and dimension tables (e.g., one per dimension).

However, as described herein, an MDAV can be provided based on an underlying in-memory, columnar database (e.g., by being based on a view of such a database). In such a case, calculations can be performed directly on the database rather than using a secondary persistence of the data or performing calculations in the application server. A data model can model complex analytical content directly on the database layer. To consume such a model in an integrated system, a new type of MDAV (e.g., an in-memory, columnar database MDAV) can be provided. Such an MDAV can be processed as a peer to other MDAV types as described herein. For example, the MDAV type can be combined with any other MDAV type and used directly for reporting.

In contrast to basic MDAVs, in the calculation view runtime for an MDAV based on in-memory, columnar database, a new calculation scenario need not be generated; an existing calculation scenario (e.g., from the data model of the database) can be consumed.

The MDAV can represent not just the underlying database, but also define any joins, unions, or the like between a plurality of tables of the database or other databases.

Example 7

Exemplary Analytics Requests

In any of the examples herein, analytics requests can include a request for processing a multidimensional analytical view, such as navigation throughout the view (e.g., via OLAP operations), creation of new MDAVs (e.g., through join or union operations), and the like.

Example 8

Exemplary In-Memory Database

In any of the examples herein, the technologies can be implemented in an in-memory, columnar database (e.g., based on SAP HANA database technology or the like). The in-memory database can serve as the primary persistence for the data. In a cloud-based solution, memory storing the database can be maintained at (e.g., hosted by) the service provider for access by the customer. From a customer perspective, the in-memory aspect of the database can be technically transparent. So, a customer can specify an in-memory database as a data source like any other data source.

To access such a database, a view of the database can be provided. So, when an MDAV is based on such a database it is typically based on a view of the database. Such a view can have associated metadata in a modeling scenario that forms a data model for the view. As described herein, the metadata in the data model for the database view can be leveraged for MDAVs based on the database.

Such a database can be optimized for operations performed directly on the database in memory. For example, joins and unions need not be generated by retrieving database contents and then calculating a join or union.

Due to the columnar and in-memory aspects of the database, searches and other operations can be performed on columns (e.g., in the database or views of the database) as if the columns were indexed or if it were the primary key of the table, even though a separate traditional index need not be implemented.

Such an arrangement can allow tenants to work with business data at a speed that is unprecedented. Both transactional and analytical processing can be performed using the in-memory, columnar database.

Example 9

Exemplary Supplemental Metadata

In any of the examples herein, a cloud-based or SaaS environment for accessing MDAV services described herein can offer additional functionality that can be modeled in metadata. For example, automatic relations between objects can be supported in models: hierarchies, relative selections (e.g., "my team"), data types, user interface texts, and the like can be supported.

Example 10

Exemplary Business Object Support

In any of the examples herein, the technologies can support business objects. For example, a business object services provider can execute at runtime, interpret the business object model, and provide business object services such as implementing business object behaviors, based on the business object model and the metadata associated with the business object type of a business object instance.

Example 11

Exemplary OLTP Services

In any of the examples herein, create, read, update, and delete functionality can be implemented by an OLTP services runtime. Such functionality can be implemented in a transaction-safe manner and support enterprise class database processing.

A rich set of customizable functionality can be provided. Adopting a single model for dealing with business objects throughout the processing stack can lead to improvements in flexibility and performance. Multiple frameworks can be collapsed into fewer elements. So, for example, more business object behaviors can be automatically generated or modified without having to resort to writing or modifying software code.

Example 12

Exemplary Business Logic

In any of the examples herein, business logic can be the logic implemented by a business object to perform its operations on data, such as business object attributes. For example, determinations, actions, and validations can be performed to accomplish business process tasks. The aggregated business logic of different business object types can form a business logic layer in the business object model.

Such business logic can be represented in the data models described herein. In this way, MDAVs can support analytics on objects that have custom calculations.

Example 13

Exemplary OLAP Services

In any of the examples herein, query and other online analytical processing services can be provided by an online analytical processing services runtime. Such a service can be implemented by a framework that interprets the business object model, including business object metadata.

During development, analytics queries and database views can be modeled. An analytics framework can accept the metadata for a business object and create database access (e.g., for the database views) that is optimized for the OLAP services.

Example 14

Exemplary Business Object Attributes

In any of the examples herein, business object attributes can take a variety of forms. A business object attribute definition can specify a name and data type for the business object attribute. An instance of the business object then reflects a particular value for the business object attribute (e.g., according to the data type). Such attributes are sometimes called "fields." As described herein, derived attributes can be calculated mathematically or otherwise derived from other attributes.

As described herein, extension attributes (e.g., additional fields sometimes called "extension fields" or "custom fields") can be added to a business object type definition to customize a business object. In practice, attributes can be organized by being associated with particular nodes of a business object.

Example 15

Exemplary Business Object Metadata Repository

In any of the examples herein, a business object model can comprise a business object metadata repository that stores business object configuration information (e.g., data describing business objects, their attributes, and relationships between them). Such metadata can be separated from the business object business logic (e.g., be stored as accessible attributes that can be evaluated rather than being executed as code). By splitting some business object configuration information out of the business object business logic, certain aspects of the system can bypass the business logic, resulting in improved performance.

The metadata repository can be used to generate runtime artifacts and serve as a common transport mechanism for design time and runtime entities. The metadata repository can include an API layer to provide uniform read and write APIs to access repository objects; a repository metamodel that supports simple introduction of new repository objects; a repository runtime that provides transactional services to create and administer repository objects; and a persistency layer that allows repository objects to be stored in several storage types, depending on purpose.

The metadata repository runtime can work under a business object processing framework that can be used as an implementation layer for consistency checks, activation of models, and the like.

When building views involving objects, the metadata repository can assist at design time. Logic can be implemented in code in a code editor and saved in a code repository, which can be referenced in the metadata repository.

Example 16

Exemplary Multidimensional Analytical View Integration in In-memory Database

Figure 3:
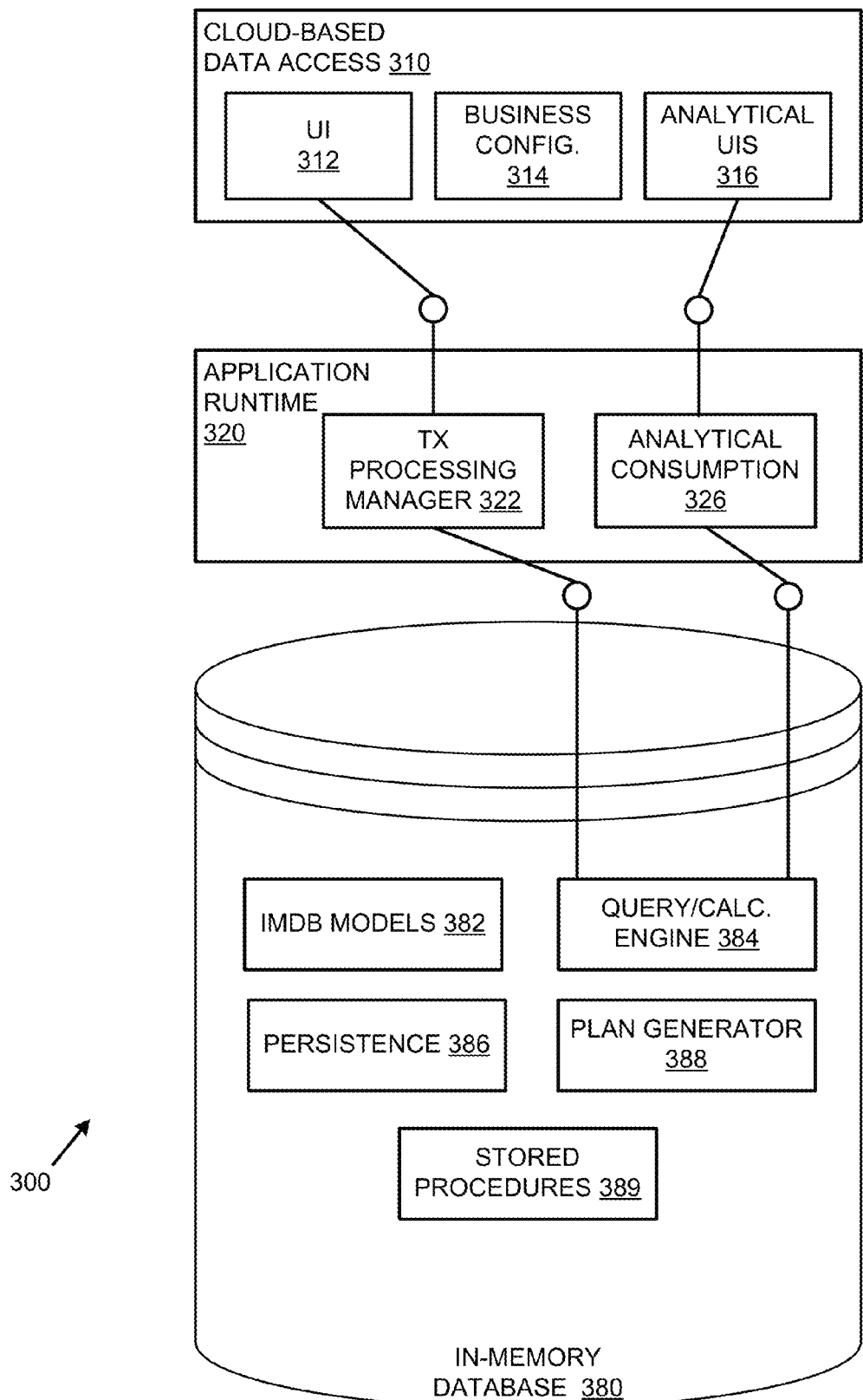
FIG. 3 is a block diagram of an exemplary system implementing multidimensional analytical view integration in an in-memory database.

FIG. 3 is a block diagram of an exemplary system 300 implementing multidimensional analytical view integration in an in-memory database. In the example, both transaction and analytical services are provided via cloud-based data access 310. Although an in-memory database 380 is shown, some multidimensional analytical views can include data sources of other types (e.g., mixed with in-memory database data sources).

The cloud-based data access 310 includes general (e.g., transactional) user interface functionality 312, business configuration 314, and analytical user interface functionality 316.

An application runtime 320 (e.g., application server or the like) can include a transaction processing manager 322 and analytical consumption 326, both of which can access the in-memory database 380.

In the database layer of the in-memory database 380, the in-memory database models 382 can model the data and can include data model as described herein, which can be used to derive MDAV data models.

Typically, the application runtime 320 consumes analytical data for MDAVs and performs calculations on the data as specified in an associated data model. However, as described herein the models 382 can be used so that calculations are instead performed at the database layer.

There is typically no overlap between MDAV data models and business object models because the business object model covers the aspects of transactional data processing. Business object models are evaluated in analytics, but typical reporting requests cover other aspects of the transaction activity.

Business logic can be mainly with in the database (e.g., table model 382 and stored procedures 389). However, business logic can also reside in the application runtime 320 layer for a business object. It is possible to execute determinations that implement the business logic. Within analytics, the business logic can be part of the data source, report, and key figure definitions.

The query and calculation engine 384 can perform query operations, including unions and joins. Calculation can also be performed at the database layer as described herein. Such an approach can avoid having to retrieve the data and performing the calculations externally to the database 380.

Persistence functionality 386 can be provided by which values (e.g., characteristics) can be saved for fields (e.g., attributes) of business objects represented by the database 380.

A plan generator 388 can generate calculation plans as described herein to carry out incoming analytics requests.

Stored procedures 389 can be called upon to perform a variety of calculations when fulfilling analytics requests.

Example 17

Figure 4:
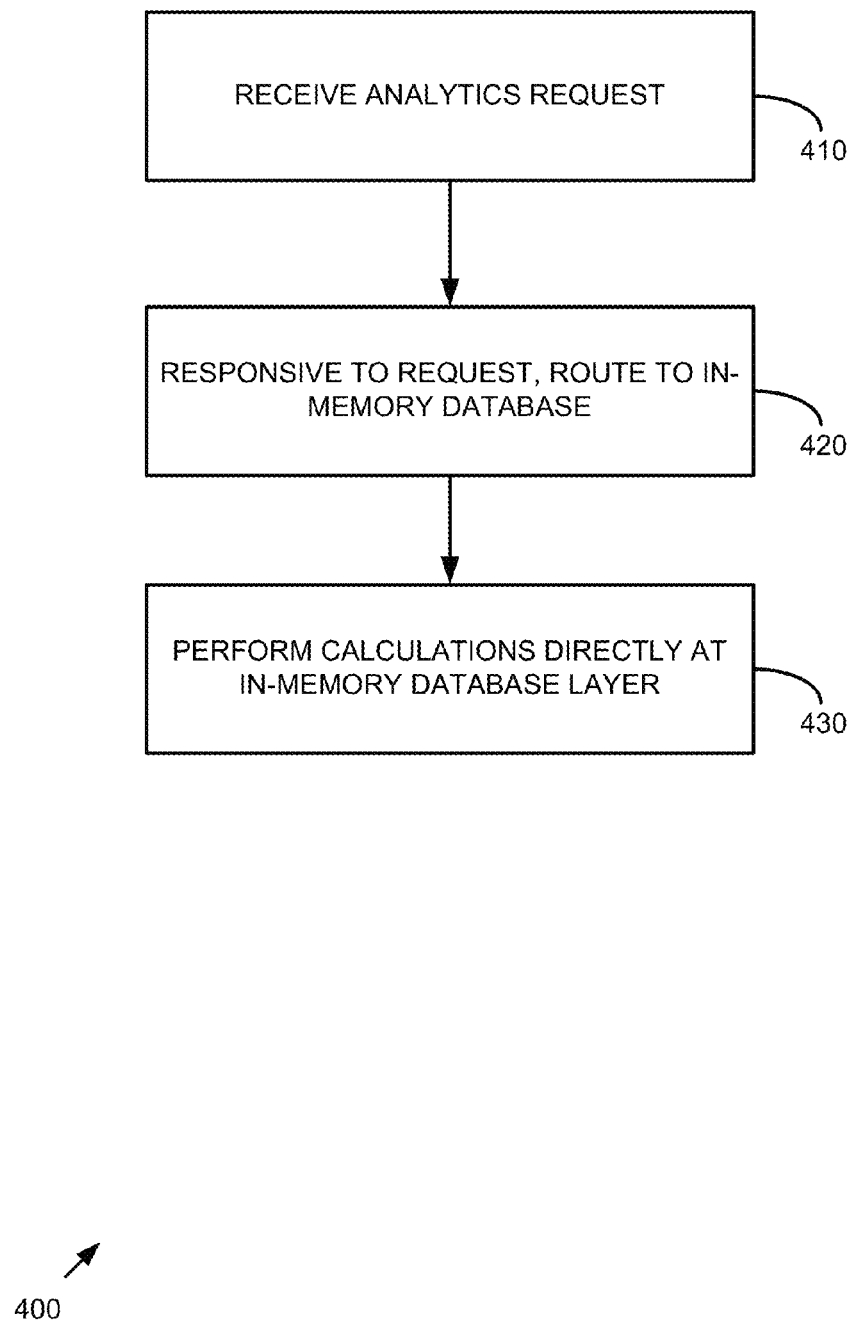
FIG. 4 is a flowchart of an exemplary method implementing multidimensional analytical view integration in an in-memory database.

Exemplary Method of Multidimensional Analytical View Integration in In-Memory Database FIG. 4 is a flowchart of an exemplary method 400 implementing multidimensional analytical view integration in an in-memory database and can be implemented, for example, in the system shown in FIG. 3.

At 410, an analytical request is received. For example, a request for processing or manipulating a multidimensional analytical view can be received. Such a request can originate from a consumer of online analytical processing services as described herein.

At 420, responsive to the request, the request is routed to an in-memory database. For example, an in-memory database persisting characteristics for attributes incorporated into the MDAV associated with the request can be used. The MDAV is typically associated with the database via a view.

At 430, calculations are performed directly at the in-memory database layer (e.g., directly on the database). Such calculations can implement custom business logic as incorporated into business object models and MDAV models for the business objects persisted in the database. As described herein, such calculations can be performed according to a generated calculation plan.

Modification of the business object configuration can be reflected in the model, which then applies such modifications to MDAV processing. Thus, business object configurations can be easily modified by a user or developer without detailed knowledge about programming.

Example 18

Exemplary Calculation Plan Generator for MDAV Integration

Figure 5:
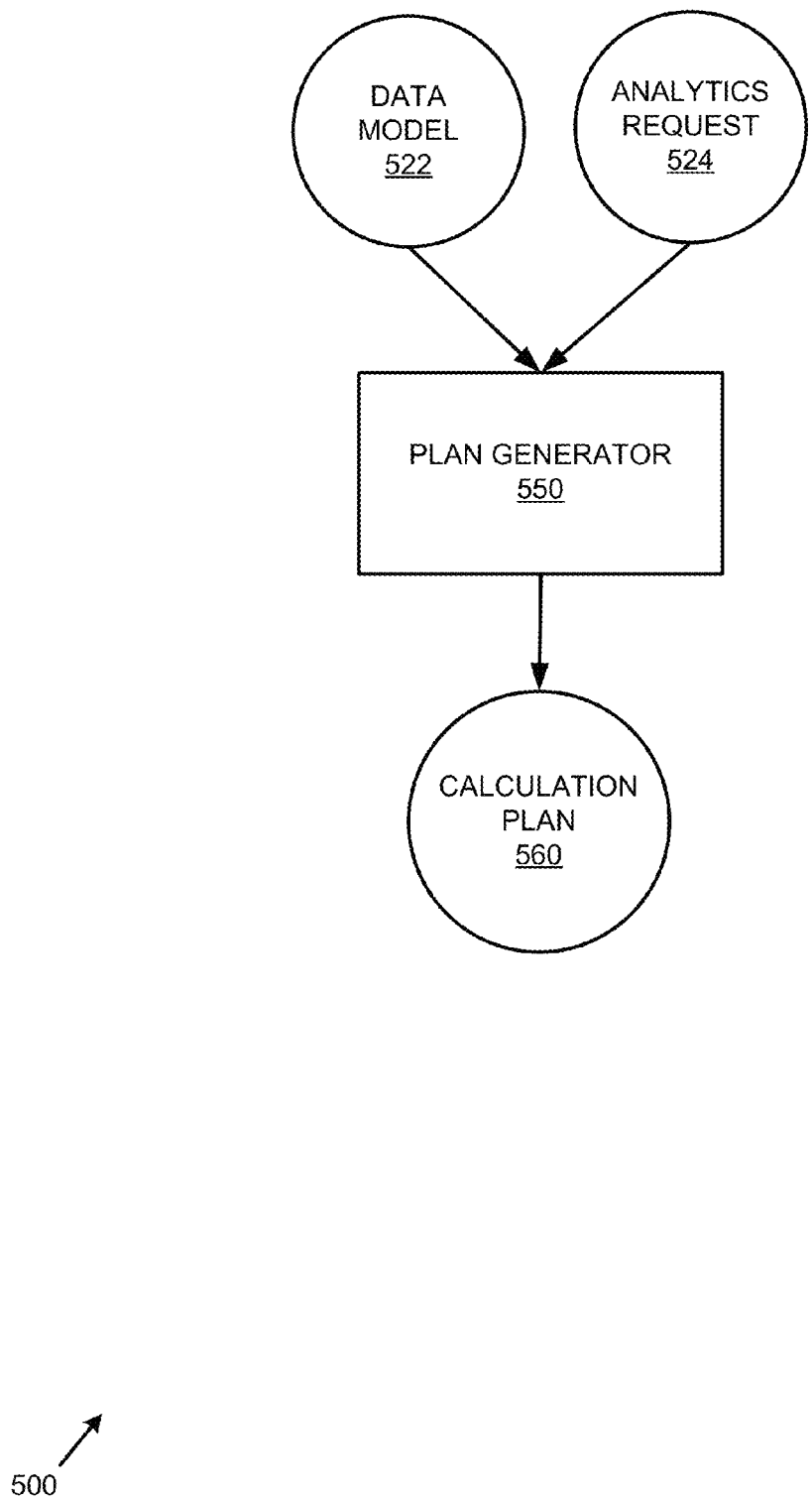
FIG. 5 is a block diagram of a system comprising a calculation plan generator for implementing multidimensional analytical view integration.

FIG. 5 is a block diagram of an exemplary system 500 comprising a calculation plan generator 550 for implementing multidimensional analytical view integration.

In the example, the generator 550 accepts a data model 522 (e.g., an MDAV data model, a data model of the view of an in-memory, columnar database underlying the MDAV, a model of business objects incorporated into the MDAV, or the like) and the analytics request 524 and outputs a calculation plan 560, which is then used to perform calculations on the database that yield data to fulfill the analytics request 524.

Example 19

Exemplary Method of Generating Calculation Plan

Figure 6:
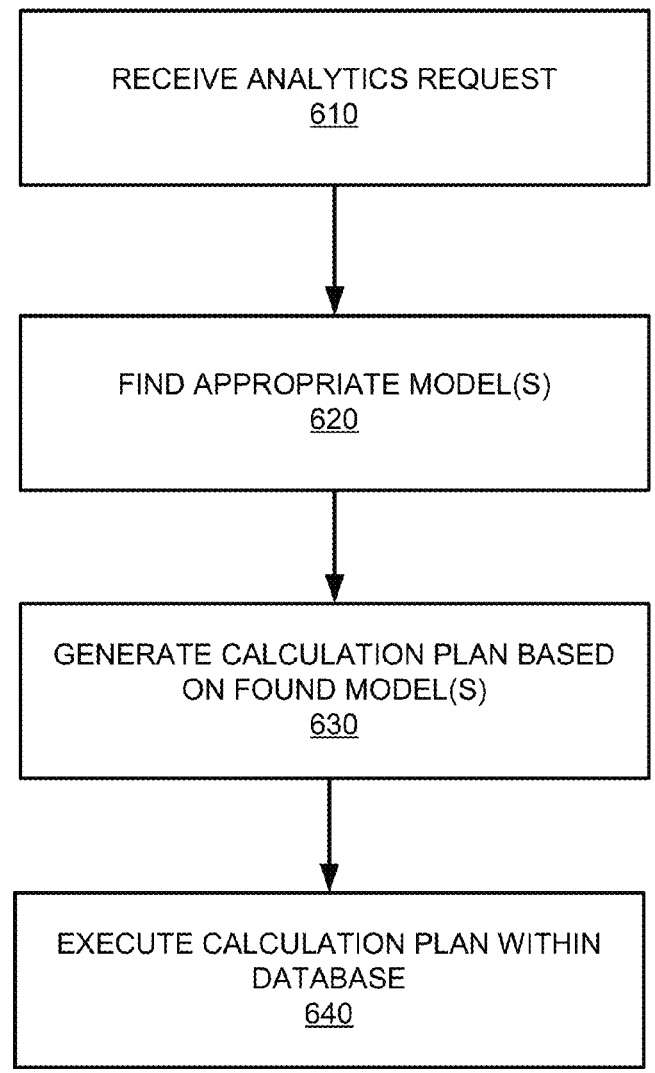
FIG. 6 is a flowchart of an exemplary method implementing calculation plan generation.

FIG. 6 is a flowchart of an exemplary method 600 implementing calculation plan generation and can be implemented, for example, in the system shown in FIG. 5, or the like.

At 610, an analytics request is received as described herein.

At 620, one or more appropriate models for the request are found. For example, if the request involves a particular business object or business object node, the appropriate data model can be located.

At 630, a calculation plan is generated based on the found models.

At 640, the calculation plan is executed within the database layer (e.g., directly on the database). Thus, such calculations are pushed to the database.

Because the calculation plan can be generated for a wide variety of business logic scenarios as modeled, flexible navigation in an analytics environment can be supported without having to resort to programming.

Example 20

Exemplary Calculation Plan

In any of the examples herein, a calculation plan can specify the operations to be performed on the in-memory database to result in the requested data. For example, in the case of business logic that involves custom calculations, such calculations can be incorporated into the calculation plan. The plan can thus be indicative of how to fulfill an analytics request (e.g., by indicating calculations).

Operations for joins, unions, and the like can also be included.

Example 21

Exemplary Role-Based Access Management

In any of the examples herein, the concept of restrictions with respect to authorizations for MDAVs based on in-memory, columnar databases can be the same as that for basic MDAVs. Multiple access control lists (ACLs) can be assigned.

During runtime, exactly one access code can be used for authorizations. The access code can be chosen by a matching of ACLs to the workcenter views to which a report is assigned and the ACLs that the MDAV is offering. If there is more than one ACL matching, then one is chosen (e.g., by a user).

It is possible to model MDAVs without access control. If so, no instance-based authorizations are used.

A view can be required to offer at least attributes for the access group context code element and access group UUID element.

For time dependencies, it can be required to offer two more attributes: start date element and end date element.

Such fields can be maintained at the MDAV for access contacts that the MDAV is intended to support.

The configuring user interface need not maintain multiple ACLs. So, only one access control node need exist for MDAVs which are created by a configuring user analytics.

Fields that are maintained for access control can be prevented from being used as view elements. The MDAV can offer a check to prevent such a condition. The value help in the configuring user analytics tool (e.g., KUA tool) can also take the condition into account.

During runtime, the access context codes can be retrieved from role-based access management (RBAM) and handed over to the in-memory, columnar database view as part of the selection condition (e.g., select . . . where . . . <normal restriction for report> . . . and <restrictions with respect to RBAM>).

If so:
The JOIN of RBAM restrictions can be made part of the HANA view.
Each in-memory, columnar database model can be assumed to be modeled correctly with respect to RBAM.
Access codes that are used can be available before report execution.
The MDAV runtime need not apply a distinct scope or a post filter to avoid duplicates if multiple access control contexts are assigned to one set of data.

More than one entry in an ACL table that corresponds to one entry of transactional data can be avoided. The process that creates the ACL entries can be responsible for such consistency. The process can also be responsible for synchronizing the ACL entries with data in the views.

Example 22

Exemplary Text Conversion

In-memory, columnar database views need not take text-id dependencies into account. However, in reporting, it may be desired to handle texts and IDs, so assignment of texts to ID-elements can be supported. For such ID-elements, the MDAV runtime can perform an automatic text conversion. The text need not be available in the report as an independent characteristic, but only as a property of the ID.

The designer tool can take over such assignment automatically. For example, a naming convention can be used in the view.

Example 23

Exemplary Currency and Unit Handling

Currencies and units can be supplied with International Standards Organization (International Organization for Standardization) codes. If the original data uses some other format, a conversion can be implemented in the in-memory, columnar database view using a currency conversion, or ISO codes can be joined as part of the view. In both cases, the MDAV model can be restricted to exposing only unit and currencies with ISO codes. The calculation view can be responsible for code transformation.

Unit and currency fields of quantities and amounts can be determined automatically in the MDAV model.

To be able to pass the target currency and the reference currency translation date to the currency conversion functionality, an API can be provided to pass such parameters to the calculation view.

A variable MDAV and corresponding extension of MDAV key factor composites (MKFCs) can be implemented. An attribute for "DB-based currency translation" can be used. If set, MKFCs can generate two variables for currency translations; the MKFC can pass the variable values to the involved MDAV; and the MDAV runtime can pass the variable values to the currency conversion restriction rules.

Example 24

Exemplary Business Object Nodes

In any of the examples herein, a business object can comprise one or more business object nodes. Although any number of arrangements is possible, a hierarchical arrangement can provide certain advantages. For example, a root node can be defined as a starting point when interacting with an instance of the business object. Further nodes (e.g., item nodes, etc.) can be defined under the root.

A business object node can have one or more attributes and also specify associations (e.g., foreign keys). The node can also have associated behavior in the form of actions or methods. For example, an item node may have actions called "approve," "reject," "copy," or the like.

Pre-configured business objects can have nodes that already perform expected behavior (e.g., create, read, update, and delete) from when they are first provided to a developer (e.g., by default, in an out-of-the-box situation). Such an approach promotes uniformity and avoids errors in code, and also makes the system easier to support. Even newly created business objects can have default functionality (e.g., including persistence functionality) generated upon development, avoiding coding by the developer.

Example 25

Exemplary Data Model for MDAV Integration

Figure 7:
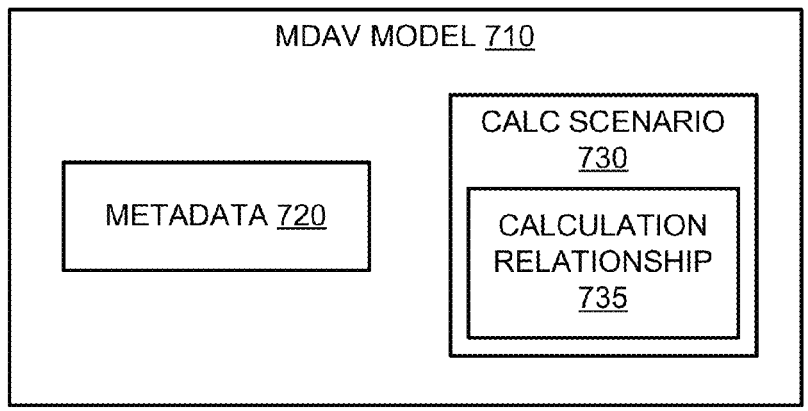
FIG. 7 is a block diagram of an exemplary system implementing a data model for use in multidimensional analytical view integration.

FIG. 7 is a block diagram of an exemplary system 700 implementing a data model for use in multidimensional analytical view integration.

In the example, an MDAV model 710 comprises a variety of metadata 720 that can help identify context for the model 710 and when it is to be applied. Such metadata can be drawn from the data model of an underlying database (e.g., the view of the database). Rather than duplicating such data, a reference to the data can be stored.

The model 710 can include a calculation scenario 730, which includes one or more calculation relationships 735. Such relationships can indicate which procedure or calculation is to be invoked on the data in the database and which fields (e.g., attributes) are involved. Join and union operations can also be specified in the model 710.

Example 26

Exemplary System Implementing MDAV Integration

Figure 8:
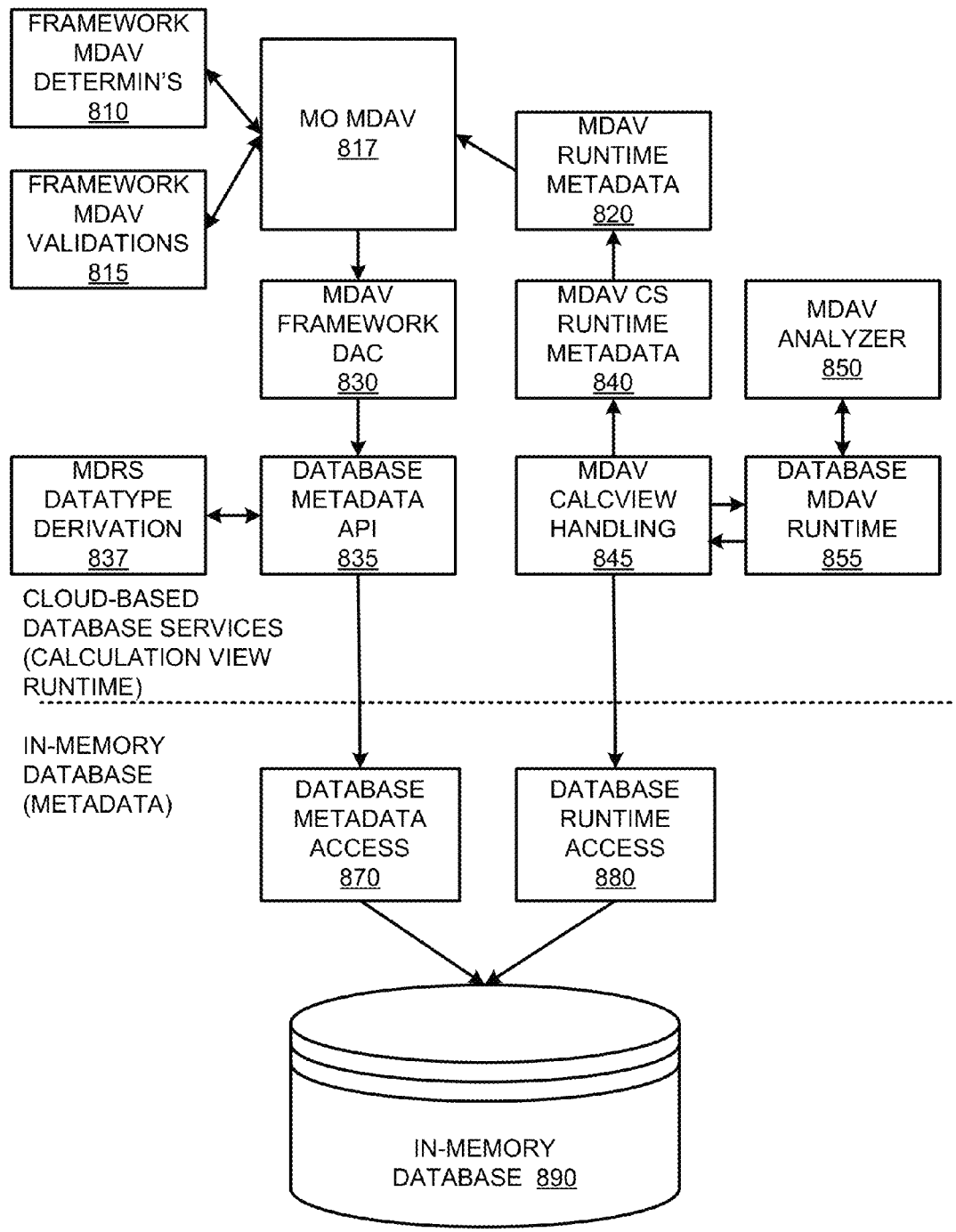
FIG. 8 is a block diagram of a system implementing multidimensional analytical view integration in an in-memory database.

FIG. 8 is a block diagram of an exemplary system 800 implementing multidimensional analytical view integration in an in-memory database that can be implemented in any of the examples herein.

In the example, a cloud-based database services layer includes framework 810 for MDAV determinations and a framework 815 for MDAV validations. An MDAV modeling object 817 can interact with an MDAV framework Data Access Component (DAC) 830.

A database metadata API 835 can interact with metadata repository service data derivation functionality 837.

An MDAV runtime metadata service 820, an MDAV calculation scenario runtime metadata service 840, and an MDAV calcview handling service 845 can also be implemented.

Calculation can be done in the database layer, but also within the application server. For example, there are complex use cases that are not pushed to the database (e.g., account assignment within balance sheet reporting, etc.) Thus, it can be determined where calculation is to be performed (e.g., in database layer or application server) based on the type of calculation.

An MDAV analyzer 850 and database MDAV runtime 855 can also be included in the cloud-based database services layer.

An in-memory database layer can include database metadata access 870 and database runtime access 880, both of which have access to the in-memory database 890.

Example 27

Exemplary System Implementing MDAV Integration

Figure 9:
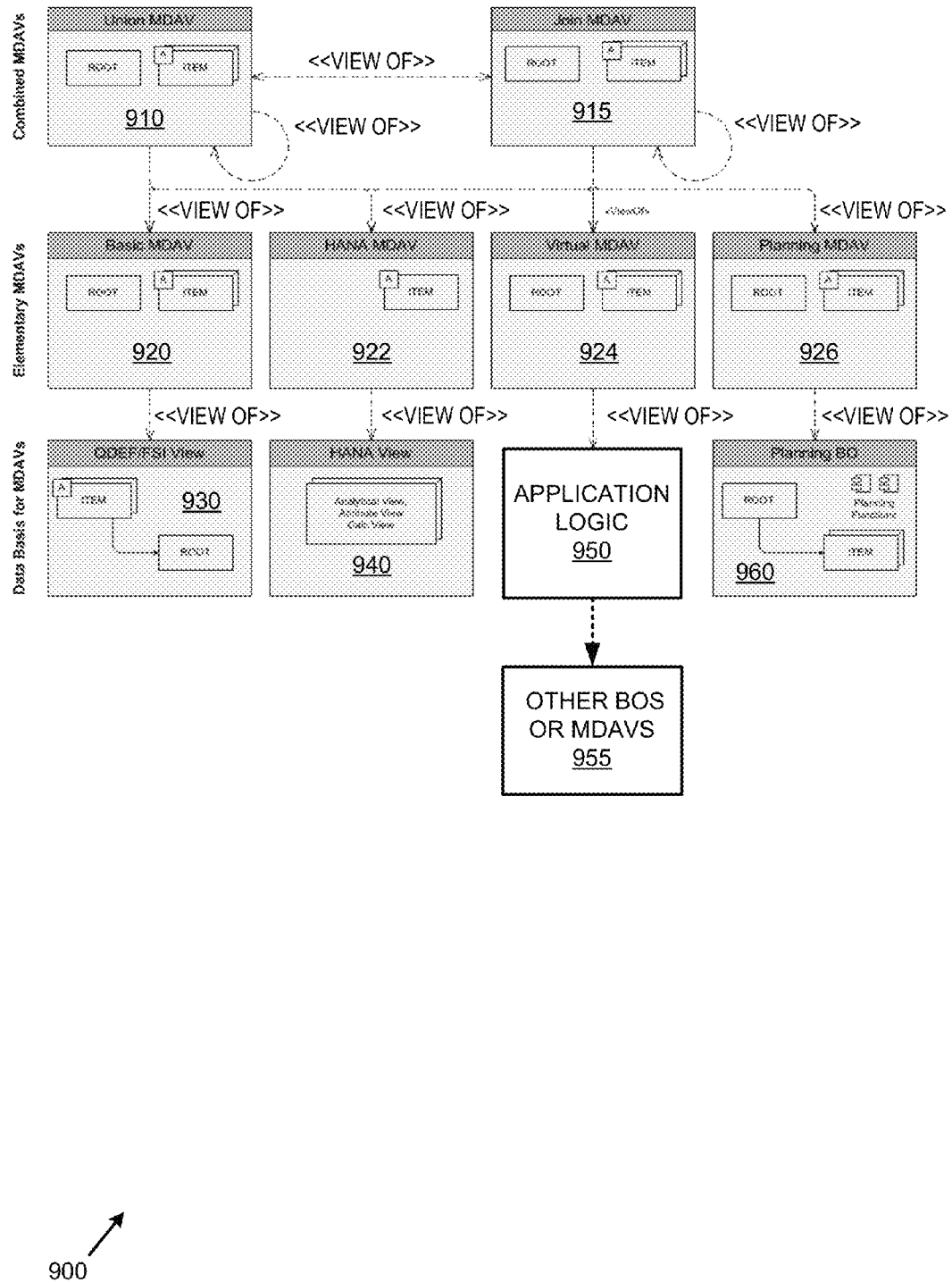
FIG. 9 is a block diagram of an exemplary system showing multidimensional analytical view system integration in context.

FIG. 9 is a block diagram of an exemplary system 900 showing multidimensional analytical view system integration in context.

In the example, a union MDAV 910 and join MDAV 915 can be supported as combined MDAVs.

Elementary MDAVs include a basic MDAV 920, an in-memory database MDAV 922, a virtual MDAV 924, and a planning MDAV 926.

The data basis for the various MDAVs include a QDEF (Query definition and modification)/FSI (Fast Search Initiative) View 930, an in-memory database view 940, application logic 950, which can consume other business objects or MDAVS 955, and a planning business object 960.

Example 28

Exemplary User Interface

Figure 10:
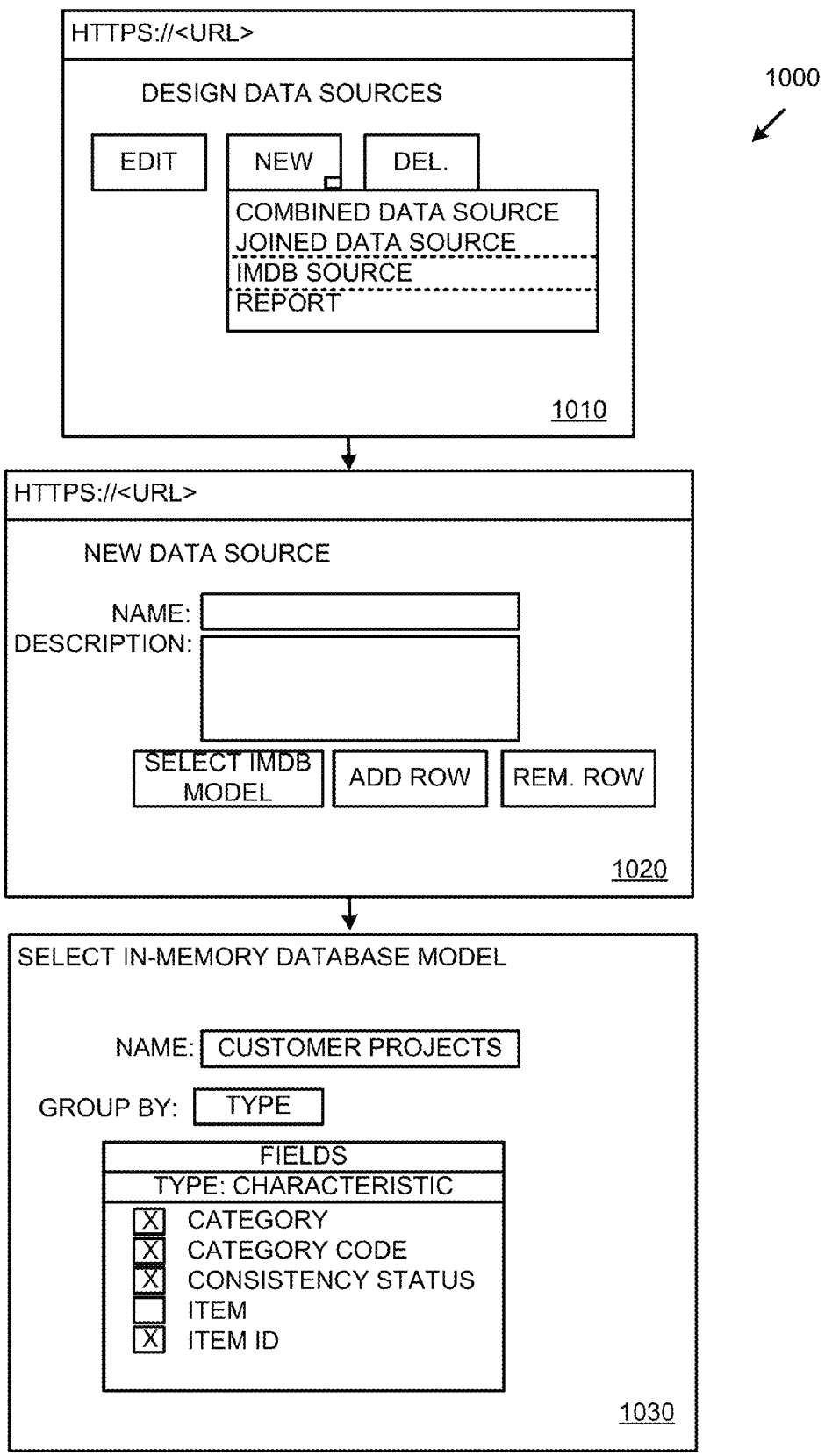
FIG. 10 is a screen shot of an exemplary user interface for achieving multidimensional analytical view integration.

FIG. 10 is a screen shot of an exemplary user interface sequence 1000 for achieving multidimensional analytical view integration. The sequence 1000 can be generated as part of a cloud-computing or SaaS scenario.

Because it is possible for customers to create their own in-memory, columnar database views in a database studio tool, an administrative user analytics tool can model MDAVS based on in-memory, columnar databases (e.g., data sources).

The user interface can be implemented with a user interface designer and an engineering change order (ECO) like other create data source user interfaces.

A user interface 1010 allows a user to specify an in-memory database as a design data source. In the example, a new data source is specified for use in business analytics.

A resulting user interface 1020 allows a new data source to be specified. The user can indicate that an in-memory database model is to be selected.

A resulting user interface 1030 allows the in-memory database model to be selected (e.g., named, and fields to be indicated).

Data types of the view elements can be proposed automatically. A matching data type with the same technical properties will be analyzed. As a fallback, there will be three generic matching data types that can be considered to match any data type: Char60 lowercase, Char60 uppercase, and Char60 with alpha-conversion.

An administrating (e.g., key) user can be enabled to overwrite the proposed data type.

Example 29

Figure 11:
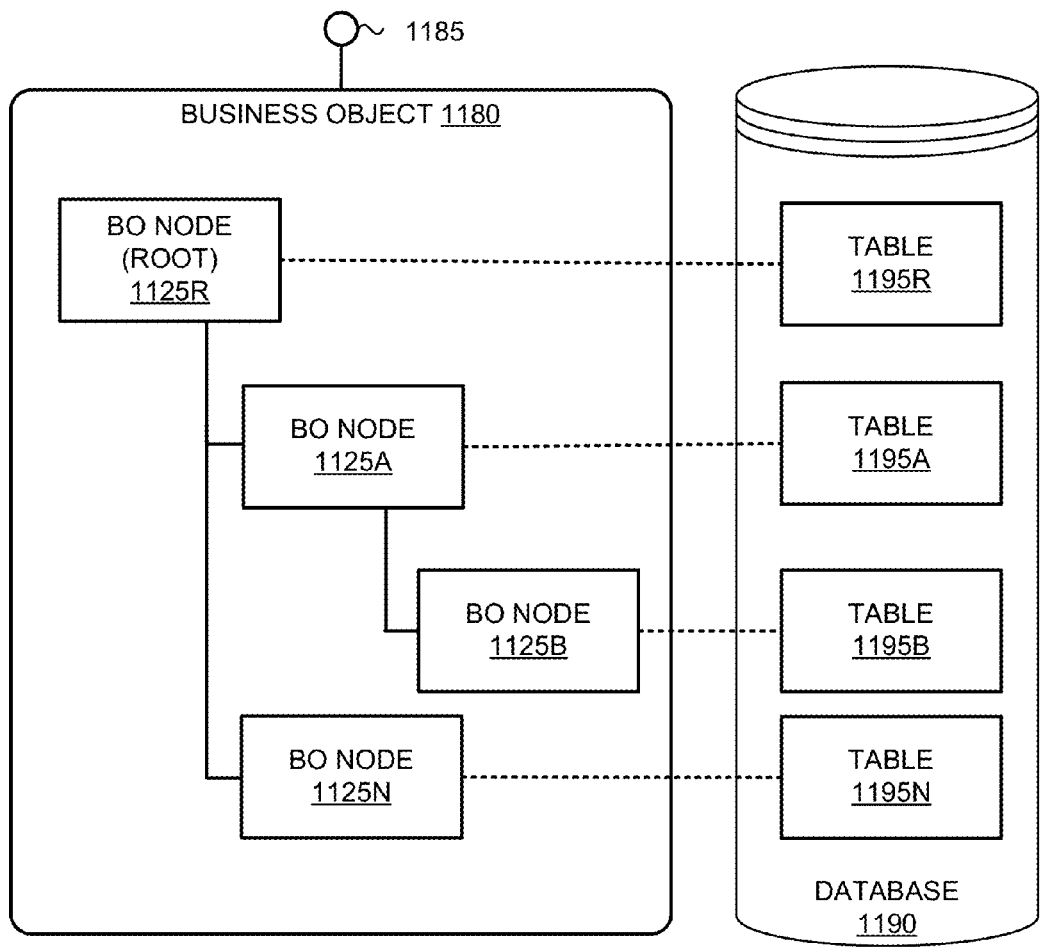
FIG. 11 is a block diagram of an exemplary system for representing a business object as business object nodes persisted by respective tables in a database.

Exemplary One-to-One Relationship between Business Object Nodes and Database Tables FIG. 11 is a block diagram of an exemplary system 1100 implementing a one-to-one relationship between business object nodes 1125R, 1125A-N and database tables 1195R, 1195A-N. In the example, a business object 1180 (e.g., accessed via interface 1185) comprises one or more business object nodes 1125A-N. The business object nodes 1125R, 1125A-N have state (e.g., business object attributes) that are persisted (e.g., stored) in respective tables 1195R, 1195A-N in a database 190. In practice, the nodes can be stored in a hierarchy so that some nodes (e.g., 525B) are hierarchically underneath others (e.g., 525A). A root node 1125R can be uniformly included in business objects to serve as a header node and for the sake of consistency.

Maintaining such a one-to-one relationship can facilitate OLAP processing on the business objects because persistence scheme idiosyncrasies of the business object are avoided (e.g., the persistence scheme transparently follows the business object node structure). Thus, the OLAP processing need not go through the business object logic and can instead go directly to the table structure, resulting in more easily understandable access and better performance.

Example 30

Exemplary Business Objects

Figure 12:
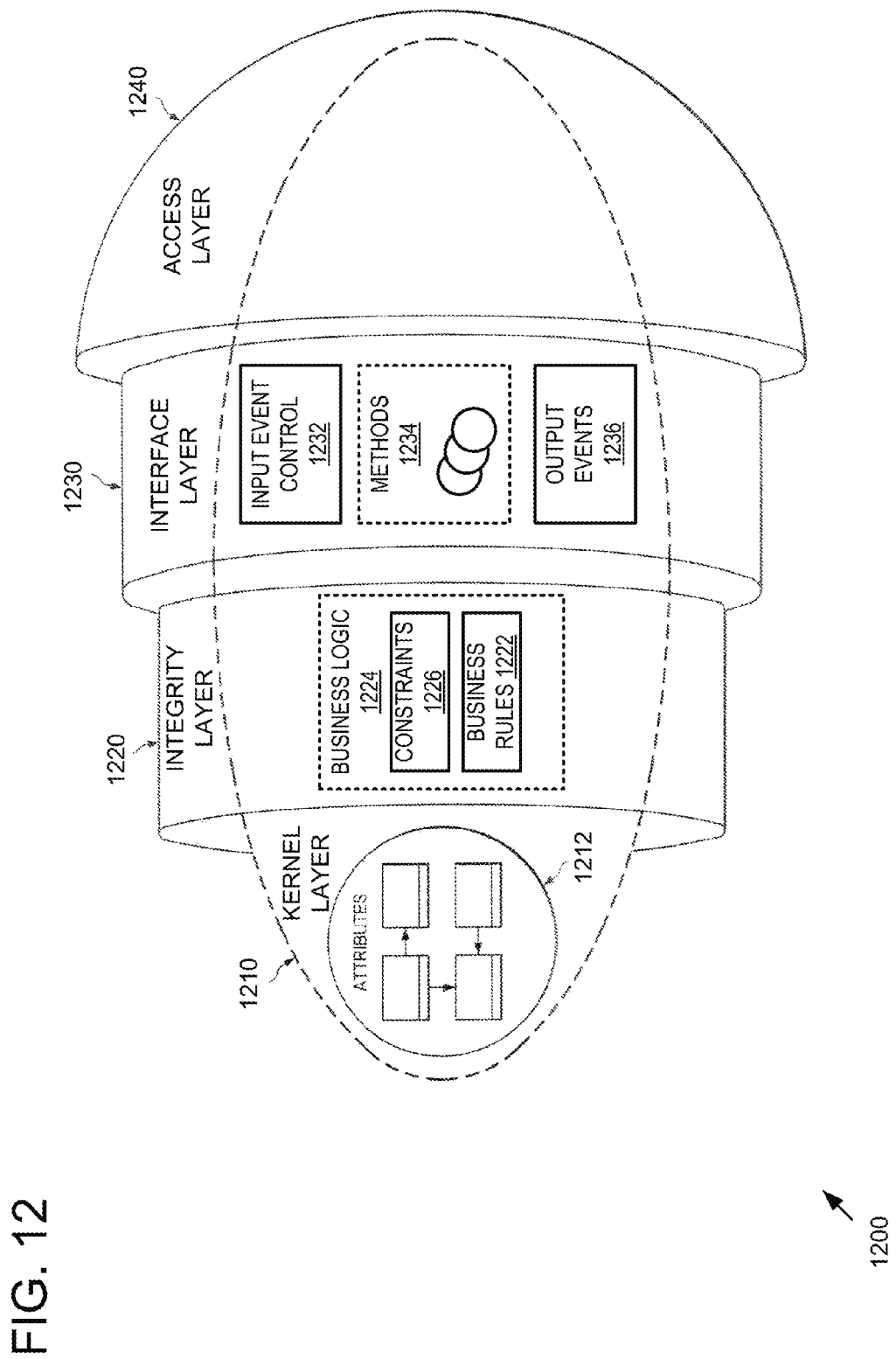
FIG. 12 is a block diagram of an exemplary business object.

FIG. 12 is a block diagram of an exemplary business object 1200. In any of the examples herein, a business object can take the form of a programmatic object that holds a set of instance variables (e.g., attributes, values, properties, characteristics, or the like). Associations between business objects of different types can be stored in metadata (e.g., as part of a data model), which results in a collection of business objects representing business relationships. The business object can be a software model representing real-world items used in a business transaction. For example, a business object may represent a business document (e.g., sales order, purchase order, production order, invoice, etc.), master data objects (e.g., product, business partner, employee, piece of equipment, etc.), or the like. In the case of a product, the business object instance can represent an actual product (e.g., with attribute values for an identifier, price, description, length, volume, or the like).

In any of the examples herein, a universe of business objects can be created and configured to operate in concert in a particular problem domain. As described herein, extension attributes and other customization techniques can be used to tailor a universe of business objects to a specific implementation. Such customizations can be achieved in many cases without coding on the part of the developer.

Business objects can support behaviors via invocation of one or more business object programmatic actions (e.g., programmatic methods), through which clients of the business objects can perform operations on the business object (e.g., on the instance variables). Such actions are typically provided via a programmatic interface that supports one or more parameters that perform a task associated with the action (e.g., cancel an order, hire an employee, change a customer classification, create a target group, and the like).

In the example, the business object 1200 can be defined to contain multiple layers. Exemplary layers include a kernel layer 1210, which represents the object's inherent data, comprising attributes 1212 of the defined business object. An integrity layer 1220 can contain the business logic 1224, which can include business rules 1222 for consistent embedding in the system and the constraints 1226 regarding the values and domains that apply. For example, business logic 1224 can comprise statements that define or constrain some aspect of the business, such that they are intended to assert business structure or to control or influence the behavior of the business entity. It may pertain to the facts recorded on data and constraints on changes to the data. The business logic 1224 can thus determine what data may or may not be recorded in the business object 1200.

The interface layer 1230 can supply valid options for accessing the business object 1200 and describe the implementation, structure, and interface of the business object to the outside world (e.g., the analytical report tool described herein). The interface layer 1230 typically contains programmatic methods 1234 (e.g., invocable to perform the actions described herein), input event controls 1232, and output events 1236.

The access layer 1240 can define the technologies that can be used for external access to the business object's data. Possible technologies can include Hypertext Transfer Protocol (HTTP), Java, COM/DCOM/COM+/.NET (e.g., based on the Component Object Model of Microsoft Corporation), CORBA (Common Object Request Broker Architecture), RFC (Remote Function Call), and the like. Additionally, the business object can implement object-oriented technologies such as encapsulation, inheritance, polymorphism, or combinations thereof.

A special case of a business object called a "business configuration object" (BCO) can be used when actions are not needed. For example, a code list (e.g., list of possible selections for an attribute) can be implemented as a BCO. BCO instances can be delivered to a customer via a business configuration schema technique. Any number of other BCO implementations are possible (e.g., PartyDeterminationRule, PurchasingContractExpiryNotificationSpecification, TripServiceProvider, PublicHolidayProperties, or the like).

Systems that employ business objects in an intelligent way can offer a rich set of reusability to non-technical users because the business objects can represent easily understandable real-world items such as an order, customer, supplier, invoice, and the like. Similarly, actions on the business objects can reflect real-world tasks (e.g., business processes, etc.) as described here.

Example 31

Exemplary Online Analytical Processing

In any of the examples herein, online analytical processing (OLAP) can be used as a tool to explore data sources (e.g., typically data base tables combined by joins, unions, or the like). In practice, online analytical processing involves multi-dimensional analytics, dimensional models, star schemas, snowflake schemas, data cubes, pivot tables, or the like.

An online analytical processing session can be based on an analytical report, which specifies data sources and relationships between such sources for the analytical report. As described herein, an OLAP session can be constructed with reference to a data model that includes at least one business object designated to model data from a data source.

Upon activation of the analytical report, an online analytical processing session begins. The session can then support navigation within the data (e.g., adding or removing certain dimensions, drilling down, slicing and dicing, consolidating data via rollups and aggregation, and the like). Thus, the data model allows ad-hoc navigation throughout the data. In the case of warehoused data such as a data cube, the user can navigate the data throughout the cube.

Although the data used for online analytical processing is traditionally separated from that used in online transaction processing (e.g., into a data warehouse), it is possible to support online analytical processing that draws from the same data sources as those used for online transaction processing.

Example 32

Exemplary Developers

In any of the examples herein, a developer can be any party or entity developing reports for access by users. Developers can include both external developers (e.g., who initially design the system for use and customization by customers) and internal developers (e.g., customer-level developers or key users who customize and/or extend the system for use by internal customers). As described herein, customization by internal developers can be greatly simplified in many cases by avoiding the need for software coding. Default functionality and behaviors can be provided during customization.

Example 33

Exemplary Computing Systems

Figure 13:
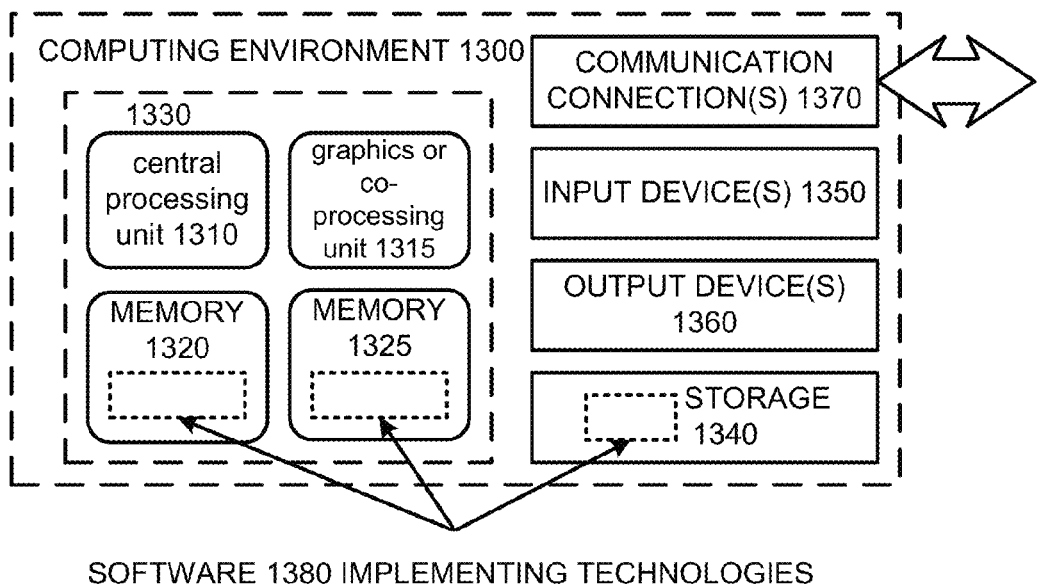
FIG. 13 is a diagram of an exemplary computing system in which described embodiments can be implemented.

FIG. 13 illustrates a generalized example of a suitable computing system 1300 in which several of the described innovations may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 34

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method performed at least in part by a computing system, the method comprising:
receiving a request for processing a multidimensional analytical view, wherein the multidimensional analytical view comprises a union operation and a join operation;
choosing between performing calculations at a database layer or an application server based on a type of the calculations;
responsive to the request, routing the request to an in-memory database; and
performing calculations for fulfilling the request directly on the in-memory database, comprising performing the union operation and the join operation directly on the in-memory database;
wherein the union operation and the join operation are performed directly on the in-memory database at the database layer without first retrieving database contents.

2. One or more computer-readable storage media comprising computer-executable instructions for performing the method of claim 1.

3. The method of claim 1 wherein:
the multidimensional analytical view comprises data originating from a business object; and
the calculations for fulfilling the request are defined as business logic for the business object.

4. The method of claim 1 further comprising:
modeling joins, unions, and calculations in a data model comprising metadata for the multidimensional analytical view.

5. The method of claim 1 wherein:
the modeling is performed responsive to receiving a configuration directive from a web-based tool.

6. The method of claim 1 further comprising:
defining the calculations for fulfilling the request in a data model of the multidimensional analytical view stored in metadata.

7. The method of claim 6 further comprising:
deriving elements of the data model of the multidimensional analytical view from a data model of an in-memory, columnar database view underlying the multidimensional analytical view.

8. The method of claim 6 wherein:
the metadata specifies a calculation model for the multidimensional analytical view.

9. The method of claim 8 wherein:
the calculation model specifies a custom calculation on fields of a database underlying the multidimensional analytical view.

10. The method of claim 6 wherein:
the metadata specifies calculations for use with non-ISO codes when converting currencies or units.

11. The method of claim 1 further comprising:
maintaining access code fields in a role-based access management system; and
when performing access on the in-memory database, including the access code fields as part of a selection condition.

12. The method of claim 1 wherein choosing between performing calculations at the database layer or the application layer comprises:
upon determining that a calculation type for one or more other calculations is a complex use case type, performing the one or more other calculations at the application layer instead of at the database layer.

13. The method of claim 1 wherein:
performing calculations for fulfilling the request directly on the in-memory database comprises generating a calculation plan for execution on the in-memory database.

14. The method of claim 13 further comprising:
receiving a model of a business object contributing to the multidimensional analytical view; and
based on the model and the request, generating the calculation plan.

15. A system processing requests to a universe of a plurality of business objects accessing a database, the system comprising:
one or more processors;
memory;
a view on an in-memory, columnar database;
a multidimensional analytical view based on the view of the in-memory, columnar database; and
an application runtime configured to receive an analytics request, wherein the application runtime is further configured to route the analytics request to the in-memory, columnar database, and wherein the application runtime is further configured to choose between performing calculations at a database layer or an application server based on a type of the calculations;

wherein the in-memory, columnar database is configured to perform calculations directly on the database, wherein the calculations comprise a union operation and a join operation; and wherein the union operation and the join operation are performed directly on the in-memory, columnar database at the database layer without first retrieving database contents.

16. The system of claim 15 wherein:

the application runtime is configured to route the analytics request to the in-memory, columnar database based on a type of calculation involved in the analytics request.

17. The system of claim 15 further comprising:

a calculation plan indicative of how to fulfill the analytics request.

18. The system of claim 15 further comprising:

a user interface for specifying an in-memory database model as a data source for business analytics.

19. One or more computer-readable storage media comprising computer-executable instructions for performing a method comprising:

receiving a request to base a multidimensional analytical view on a view of an in-memory, columnar database, wherein the multidimensional analytical view comprises a union operation and a join operation;

receiving an analytics request for the multidimensional analytical view;

choosing between performing calculations at a database layer or an application server based on a type of the calculations;

routing the analytics request directly to the in-memory, columnar database; and performing the union operation and the join operation directly on the in-memory, columnar database;

wherein the union operation and the join operation are performed directly on the in-memory, columnar database at a database layer without first retrieving database contents.

* * * * *